C. L. BETTS.
SPRING FASTENING FOR LANTERNS.
APPLICATION FILED JUNE 22, 1904.

978,545.

Patented Dec. 13, 1910.

Witnesses:
C. B. Hornbeck
E. A. Volk

Inventor.
Chas. L. Betts,
by Wilhelm Parker & Hand
Attorneys.

UNITED STATES PATENT OFFICE.

CHARLES L. BETTS, OF NEW YORK, N. Y., ASSIGNOR TO R. E. DIETZ COMPANY, OF NEW YORK, N. Y.

SPRING-FASTENING FOR LANTERNS.

978,545.  Specification of Letters Patent. Patented Dec. 13, 1910.

Application filed June 22, 1904. Serial No. 213,629.

*To all whom it may concern:*

Be it known that I, CHARLES L. BETTS, a citizen of the United States, and resident of New York, borough of Brooklyn, county of Kings, and State of New York, have invented a new and useful Improvement in Spring-Fastenings for Lanterns, of which the following is a specification.

This invention relates to that class of spring fastenings for detachably securing the base to the body of a lantern in which a curved locking spring, arranged circumferentially on the lantern, is provided at its free end with a head which has usually an aperture for engagement with a locking stud or pin on the opposing part of the lantern, so that by a partial rotation of one part on the other the locking stud is engaged in the opening of the spring, whereby the base and body of the lantern are secured together. In this class of fastenings the spring catch or locking spring has a positive engagement with the stud, which engagement cannot be released merely by rotating one part on the other but requires the head of the spring to be pressed away from the stud far enough to release the spring from the stud, when by a partial rotation in the reverse direction the parts can be separated.

The object of this invention is to produce such a spring fastening in which the engagement of the spring with the stud is not positive but is yielding to such an extent that the fastening can be released by a partial rotation of the base with reference to the body of the lantern upon applying the force necessary to press the head of the spring out of the way of the stud.

Figure 1:
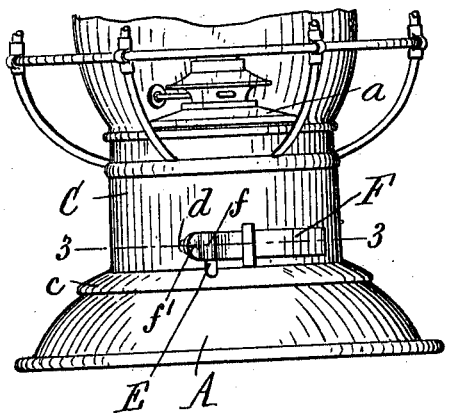
Figure 2:
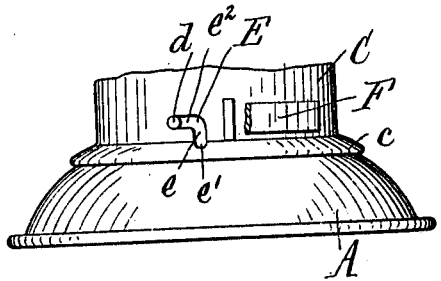
Figure 4:
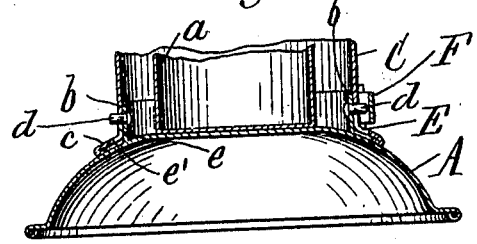
Figure 3:
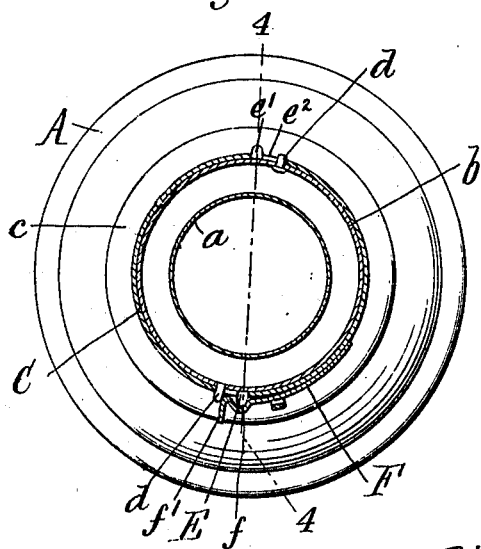
Figure 5:
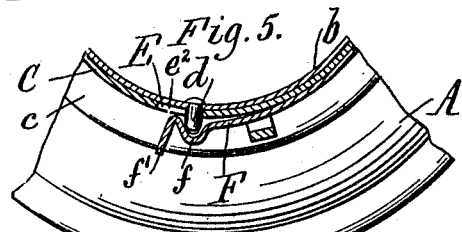
Figure 6:
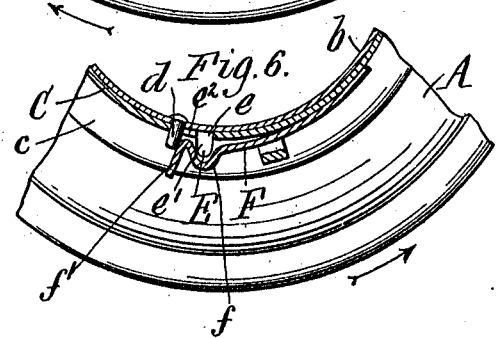

In the accompanying drawings: Figure 1 is an elevation of the lower portion of a lantern provided with my improved fastening. Fig. 2 is an elevation of the lower portion of the lantern with the locking spring partly broken away. Fig. 3 is a horizontal section in line 3—3, Fig. 1. Fig. 4 is a vertical section in line 4—4, Fig. 3, but showing the base unlocked. Fig. 5 is a fragmentary horizontal section of the fastening, on an enlarged scale, showing the stud engaged in the concave portion of the locking spring, as in Fig. 4. Fig. 6 is a similar view, showing the stud in the locked position, as in Fig. 3.

Figure 7:
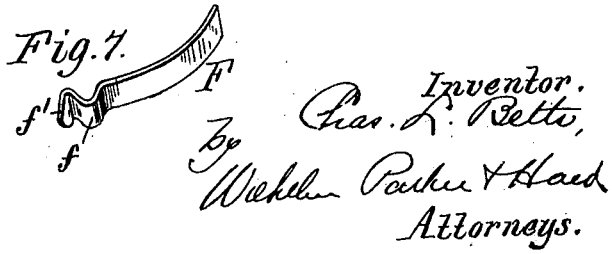

Fig. 7 is a detached perspective view of the spring.

Like letters of reference refer to like parts in the several figures.

A represents the base of a railroad or other lantern provided with the oil pot $a$ and the usual upwardly projecting collar $b$ surrounding the oil pot.

C represents the body hoop or lower ring of the lantern body which fits around the collar $b$ and rests on the base A outside of the same. This body hoop may be provided at its lower end with a flange $c$ which rests on the base A.

$d$ represents the usual horizontal, outwardly projecting locking studs which are secured to the collar $b$ of the base on diametrically opposite sides thereof.

E represents the usual angular locking slots formed in the lower portion of the body hoop to receive the locking studs. The vertical portion $e$ of each slot opens downwardly through the base flange $c$ of the body hoop, where each slot is provided with an enlargement $e'$, Fig. 6, which permits the stud to pass up in the vertical portion of the slot and to be engaged in the horizontal portion $e^2$ of the slot by a partial rotation of the base with reference to the lantern body.

F represents the locking spring which is secured circumferentially to the outer side of the body hoop and arranged with its head in front or outside of one of the slots E. The head of the spring is composed of a bent portion $f$ and an end portion $f'$. The bent portion $f$ is concave on its rear side or adjacent to the body hoop. This concave portion, groove or recess stands in front of the vertical portion $e$ of the slot and is of sufficient size to permit the locking stud to enter freely from below into this concave portion, as represented in Fig. 5. The end portion $f'$ of the head is bent outwardly or away from the body hoop and stands at such a distance from the end of the horizontal portion $e^2$ of the slot that the stud is locked in the horizontal portion of the slot beyond the end of the head and is held against displacement by the end of the spring, as shown in Figs. 3 and 6. The locking face of the end $f'$ of the spring is oblique to the radial line and the angle or obliquity is such that this face approaches the stud in an outward direction or away from the side of the lantern body. This angle or obliquity is sufficient to cause the stud to force the locking spring outward, or away from the lantern body, and unlock the parts, without releasing or manipulating the spring, by simply turning the base with reference to the lantern body in the proper direction, indicated by the arrow in Fig. 6. During this movement the stud wedges the head of the spring out of its way and moves in the horizontal portion of the slot until it reaches the vertical portion thereof, when the stud stands in line with the concave portion $f$ of the spring. The stud may be made slightly tapering to promote this unlocking action. The obliquity of the locking face of the spring and the taper of the stud are, however, comparatively small and compel the application of considerable force for pressing the spring out of its locking position and hold the parts locked securely against accidental unlocking.

For attaching the base to the body of the lantern the base is engaged with its studs in the vertical portions of the slots, whereby one of the studs is caused to enter the concave portion $f$ of the spring. The base is now turned with reference to the lantern body in the proper direction to cause the studs to move in the horizontal portions of the slots toward the ends thereof, which direction is indicated by the arrow in Fig. 5. During this turning movement the stud which was engaged in the concave portion $f$ of the spring presses the head of the spring out of its way and passes beyond the end $f''$ of the spring, without requiring the spring to be manipulated for this purpose. When the stud has reached this position the spring returns to its normal position in which it lies against the body hoop. In this position the stud is locked between the end of the spring and the end of the slot, as shown in Figs. 3 and 6. In order to release the fastening it is only necessary to turn the parts in the reverse direction with sufficient force to force the head of the spring out of the way of the stud and return the stud to a position in the concave portion $f$ of the spring, Fig. 5, when the parts of the lantern can be separated by a vertical movement of one part with reference to the other. The oil pot or base is by this means locked to and unlocked from the lantern body simply by turning the base and body of the lantern with reference to each other in one or the other direction and without requiring the spring to be manipulated, whereby the lantern is rendered much more convenient than heretofore.

I claim as my invention:

The combination with a lantern base provided with a locking stud and a lantern body provided with an angular slot for said stud, of a locking spring secured at one end to the lantern body and having its opposite free end arranged opposite said slot and provided with a locking face against which said stud engages when located in the end portion of said slot, said face inclined outwardly toward said stud, so as to cause the spring to be deflected outwardly upon forcibly pressing the stud against said locking face by a rotary movement of the base and the lantern body with reference to each other, without requiring the spring to be manipulated, while the resistance of the spring to such unlocking movement is sufficient to hold the parts locked against accidental displacement, substantially as set forth.

Witness my hand, this 17 day of June, 1904.

CHARLES L. BETTS.

Witnesses:
 OSCAR WARNER,
 J. C. BROWN.